US007375936B2

(12) United States Patent
Morishita

(10) Patent No.: US 7,375,936 B2
(45) Date of Patent: May 20, 2008

(54) LEAKAGE DETECTING DEVICE

(75) Inventor: Masazumi Morishita, Tokyo (JP)

(73) Assignee: Sugatsuane Kogyo Co., Ltd., Tokyo (JP)

( * ) Notice: Subject to any disclaimer, the term of this patent is extended or adjusted under 35 U.S.C. 154(b) by 441 days.

(21) Appl. No.: 11/241,838

(22) Filed: Sep. 30, 2005

(65) Prior Publication Data

US 2006/0082322 A1 Apr. 20, 2006

(30) Foreign Application Priority Data

Sep. 30, 2004 (JP) ............................ 2004-286081

(51) Int. Cl.
*H02H 3/00* (2006.01)

(52) U.S. Cl. ........................................................ 361/42

(58) Field of Classification Search .................. 361/42
See application file for complete search history.

(56) References Cited

U.S. PATENT DOCUMENTS 4,743,998 A * 5/1988 Wu ............................ 361/42
7,053,875 B2 * 5/2006 Chou .......................... 345/92
7,088,880 B1 * 8/2006 Gershman .................... 385/12

FOREIGN PATENT DOCUMENTS

JP 05-130773 5/1993
JP 05-260642 10/1993

* cited by examiner

*Primary Examiner*—Stephen W. Jackson
(74) *Attorney, Agent, or Firm*—Knobbe, Martens, Olson & Bear LLP

(57) ABSTRACT

As a result that a switching circuit switches between a first power source for supplying power when illuminating a light emitting diode and a second power source for supplying a predetermined bias to the light emitting diode, a reference signal output from a reference power source is compared with a leak current of an LED lighting device using the light emitting diode, a control signal is generated based on the comparison result, and a display means displays a leakage result when the leak current of the lighting device using the light emitting diode is higher than a reference value; a bias is set to a value, by which a current flowing to the light emitting diode can be ignored, and a leak current flowing to the lighting device using the light emitting diode is detected.

14 Claims, 7 Drawing Sheets

LEAKAGE DETECTING DEVICE

BACKGROUND OF THE INVENTION

1. Field of the Invention

The present invention relates to a leakage detecting device for detecting a leak current of a display device with a plurality of light emitting diodes (LED), etc. and generating an alarm (display) signal.

2. Description of the Related Art

Generally, a large number of lighting equipments using a plurality of LEDs as a light source have appeared on the market. There are, for example, a rope type alarm illumination device for notifying of a construction site on the road side and a display device for displaying letters, pictures and signs, etc. by using a decoration display device incorporating a large number of LED for decorating buildings and shops in place of conventional neon signs and, furthermore, there are lighting equipments using LEDs as a light source recently as typified by a traffic light.

These lighting equipments are used not only indoors but often used outdoors, so that when processing in electric connections is weak, leakage may be caused due to an influence by humidity and dust.

Other than the above, an insulation defect caused by deterioration over time due to long time use may cause leakage, and damage by animals may cause leakage.

Next, a specific example of a key part of an LED display device using LED will be explained below. A configuration example of a line light source 100 produced by mounting a plurality of LEDs on a printed substrate will be explained. As shown in FIG. 1A, a wiring pattern is formed on a printed circuit board made by a glass epoxy, etc., a plurality of LEDs are arranged at predetermined intervals thereon and, furthermore, a power source IC, resistor, capacitance and other components are mounted.

An equivalent circuit thereof is shown in FIG. 1B. a plurality of LEDs (LED-1, LED-2, . . . , LED-6) as a first group are serially connected between a power supply (voltage) line (+24V) 101 and ground line (GND) 102, a power source circuit IC101 is connected to an output of the LED-6, and an LED-7 and a resistance R101 are serially connected between an output of the power source circuit IC101 and the GND. In the same way, LEDs (LED-1A, LED-2A, . . . , LED-6A) as a next group are serially connected, an output of the LED-6A is connected to a power source circuit IC102, and an LED7A and a resistance R102 are serially connected between an output of the power source circuit IC102 and the GND. Such connection is considered as one group and arranged repeatedly.

As explained above, a display unit of a display device composed of LEDs arranged repeatedly on a substrate is cut to be any length for use in accordance with need. However, dirt, etc. may adhere to a cut surface of the substrate and cause a leak current in some cases.

Also, for example, dusts may adhere to both terminals of the LEDs and resistances and cause a tracking phenomenon, which results in leakage. Furthermore, when a high current flows, an electromigration, wherein wires are short-circuited, may be caused to generate leakage and, in the extreme case, short-circuiting results in a high current flow.

Other than the leak currents as explained above, leak currents of the LEDs themselves also arise. Electric characteristics of an output current (a forward current) with respect to an application voltage (forward voltage) of an LED are shown in FIG. 2A and FIG. 2B.

FIG. 2B shows forward bias characteristics of each LED. In a graph in FIG. 2B, the abscissa axis indicates a forward voltage from 1.0V to 6.0V and the ordinate axis indicates a forward current in a log-scale in a range of 0.1 mA to 100 mA. A red LED exhibits a forward current of 5 mA when a forward voltage is about 2.0V, and 0.001 mA or lower when 1V at the room temperature (25° C.). A green LED exhibits a forward current of 2 mA when a forward voltage is about 3.0V, and 0.001 mA or lower when 1V, and a blue LED exhibits a forward current of 2.0 mA when a forward voltage is about 3.0V, and 0.001 mA or lower when 1V.

From the data, a blue LED and red LED exhibit a forward current of 0.001 mA or lower even when a forward voltage of, for example, 2.0 V is applied, so that it can be deemed that a current virtually does not flow.

Accordingly, in a lighting device using an LED, it is possible to detect a leak current excepting that in the LED under a condition, under which a current flowing in the LED can be ignored, by supplying an equal voltage to or lower voltage than the voltage applied to the LED.

Generally, a current limit has been set in the supply power source to prevent a leakage in a lighting device or an LED lighting device, however, a high current has to flow for lighting and it has been also the same in the case of an LED. When a high current flows to an LED, even if a leakage (a leak current) arises, as explained above, it is often the case that the leak current cannot be detected only by a current limit because the leak current is very small.

Furthermore, as a result that a current flows to the leakage side and a supply to the LED reduces, a change of the current due to the leakage may be not enough to be detected comparing with the normal change. Therefore, it has been desired to detect a leakage by other method than the current limiting method for preventing it.

As explained above, a leakage preventing device of the related art reduced an abnormal current and an excessive current by detecting an abnormal current being in proportional with a leak current between a power source and a load or by detecting an excessive current when it flows to the load.

SUMMARY OF THE INVENTION

It is desired to detect in a lighting device using an LED, etc. an existence of a factor of flowing a current to other part than the LED by detecting a current flowing to a display system by utilizing the characteristic that the current flowing direction for lighting the LED is in one direction and not in the reverse direction and suppressing a voltage for applying a forward voltage to the LED to be not higher than the forward voltage (Vf).

According to the present invention, by utilizing the characteristic that the current flowing direction for lighting the LED is in one direction and the current does not flow in the reverse direction, an existence of a factor of flowing a current to other part than the LED can be detected by supplying a reverse direction voltage to the LED only during a detecting time and detecting the flowing current.

Also, by utilizing the characteristic that a forward current of the LED is as little as ignorable when a voltage is not higher than a forward voltage Vf of the diode, an existence of a factor of flowing a current to other part than the LED can be detected by supplying a forward voltage of not higher than Vf to the LED only during a detecting time and detecting the current flowing to the LED display device.

BRIEF DESCRIPTION OF DRAWINGS

These and other objects and features of the present invention will become clearer from the following description of the preferred embodiments given with reference to the attached drawings, in which.

DESCRIPTION OF THE PREFERRED EMBODIMENT

Below, embodiments of the present invention will be explained with reference to the drawings.

Figure 3:
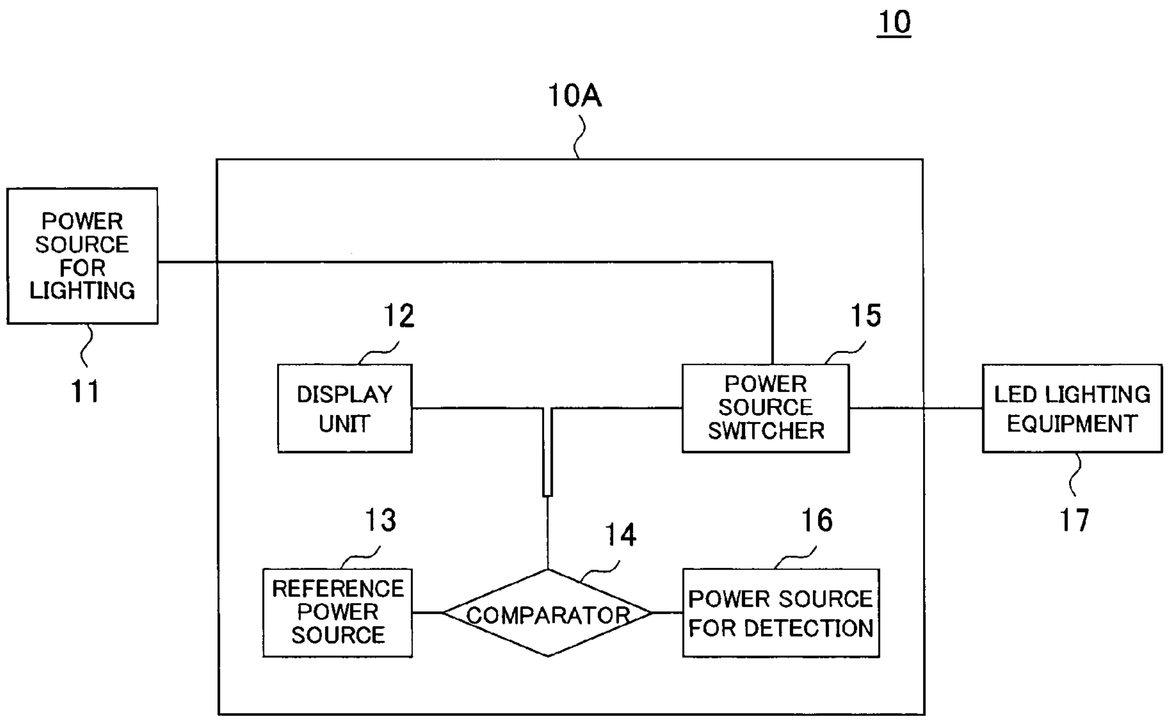
FIG. 3 is a view of a configuration example of an LED lighting leakage detecting device of a manual change-over type according to an embodiment of the present invention.

FIG. 3 shows an overall block diagram of a manual change-over type LED lighting leakage detecting device 10 according to a first embodiment of the present invention. The LED lighting leakage detecting device 10 is composed of a power (supply) source for lighting 11, a display unit 12, a reference power source 13, a comparator 14, a power source switcher 15, a power source for detection 16 and an LED lighting equipment 17.

The power source for lighting 11 is a DC power source for converting from an AC power source to a DC power source and outputting a direct-current voltage of, for example, DC+24.0V. Other than this, there are a battery drive, etc. and it is not limited to an AC/DC converter.

The display unit 12 uses an LED, etc. and turns it on/off in accordance with a detection result output from the comparator 14. For example, it turns on to light for alarming when a leak current arises and turns off an operation of the LED when a leak current does not exist or exists as little as not higher than a reference level.

Also, other than detecting a leak current instantly by turning on/off the LED, it is possible to display a leak current detection result by using letters, marks and pictures, etc. on the display.

The reference power source 13 is set to be a maximum value of a permitted range of a leak current, for example, when measuring a leak current of the LED lighting device; and when outputting the set current as a comparative current, or when not outputting the comparative current as a current, current-voltage conversion is performed for outputting as a reference voltage. When measuring the leak current, a current flowing to the LED is considered ignorable and a current for regulating other leak currents is set.

A reference current value or a reference voltage value output from the reference power source 13 and a current generated due to a leak current flowing in the LED lighting device 17 excepting that in the LED are input to the comparator 14, where the leak currents are converted to a voltage and compared with a detected voltage. The comparison result in the comparator 14 is output to the display unit 12. For example, when the detected voltage is higher than the reference current or reference voltage from the reference power source 13, it is determined that a leak current is generated, while when the detection voltage is lower, it is determined that a leak current is not generated.

The power source switcher 15 supplies power (+24.0V) from the power source for lighting 11 to the LED lighting device 17 in a normal operation and switches to the power source for detecting 16 when measuring a leak current. When measuring a leak current, as a voltage to be supplied to the LED lighting equipment 17, for example, a voltage of 0.55V is supplied to a power source voltage line, 2.5V is supplied to the ground line and a reverse voltage is supplied to the LED via the power source switcher 15.

Another voltage supply method at the leak current measurement is to switch a power source voltage (+24.0V) to a direct-current voltage of +1.0V and +3.0V and supply the voltage to the power source line of the LED lighting equipment 17, then, switch to the power source for lighting 11 when the measurement is completed so as to supply the switched power source voltage (+24.0V) to the LED lighting equipment 17.

If leakage arises in the LED lighting equipment 17, the power source switcher 15 continues to supply a voltage for detection and measurement.

In the case where a leak current excepting the LED is low in a normal operation, when measurement of a leak current is completed, the switch is turned, so that a direct-current voltage (24.0V) can be supplied from the power source for lighting 11.

The power source for detection 16 is used when the power source is switched by the power source switcher 15 to measure a leak current in the LED lighting equipment as explained above and generates a direct-current voltage of 0.55V and 2.5V when supplying a reverse bias to the LED.

On the other hand, when supplying a forward voltage to the LED, the power source for detection 16 outputs, for example, a direct-current voltage of +1.0V in the case of a red LED and +3.0V in the case of a blue LED.

Note that the direct-current voltage has to be set in a range, by which a current flowing to the LED becomes ignorable comparing with a leak current in the lighting equipment excepting that in the LED. Also, when a plurality of LEDs are serially connected in the LED lighting equipment, direct voltages by the number are output.

Figure 1A:
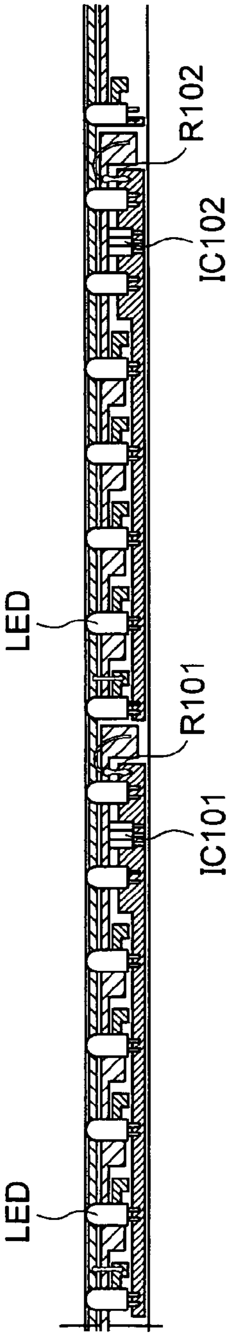
FIG. 1A is a view of a line light emitting device using LEDs and FIG. 1B is a view of the configuration of an equivalent circuit thereof.
Figure 1B:
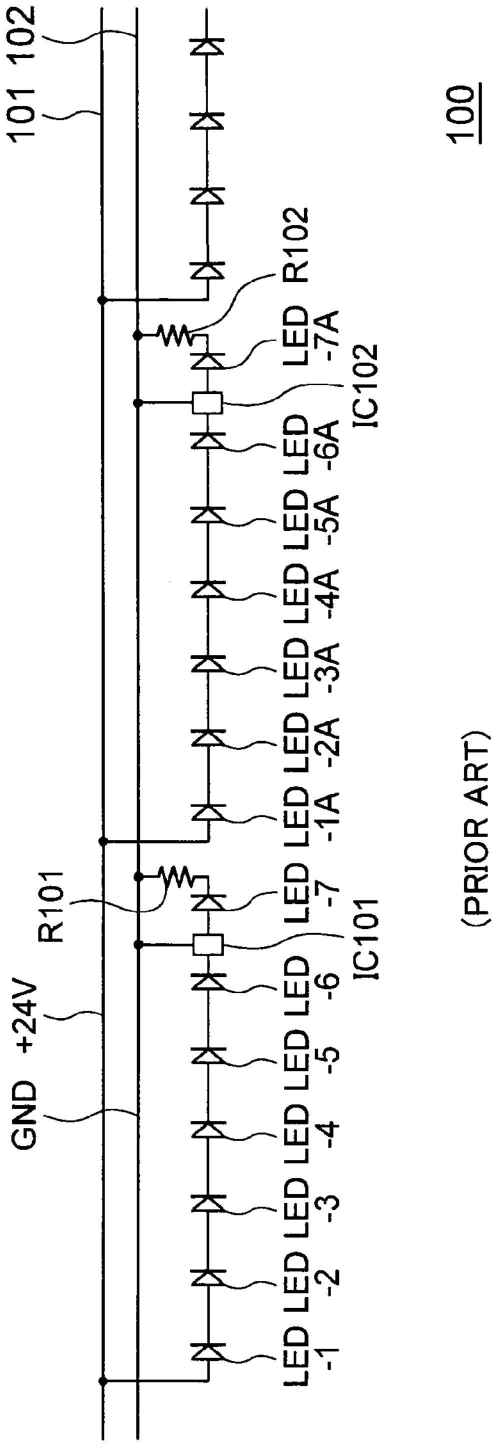
FIG. 1B (PRIOR ART)

As the LED lighting equipment 17, there are, for example, line display devices as shown in FIG. 1A and FIG. 1B and other variety of display devices.

Next, an operation of the manual switch-over type LED lighting leakage detecting device 10 will be explained with reference to FIG. 3. The power source switcher 15 switches from the power source for lighting 11 with +24.0V to the power source for detection 16, so that a direct-current voltage for a detection voltage (+0.55V, +1.0V and +3.0V, etc. in the case of one LED) is generated and supplied to the LED lighting equipment 17.

For example, in FIG. 1B, when supplying a reverse bias to the LED of the LED lighting equipment 17, a voltage of +0.55V is supplied to the power source line 101 and +1.0*6V is supplied to the ground line 102, respectively. A plurality of LEDs (LED-1, LED-2, LED-6) are connected serially between the power source line 101 and the ground line 102, an output of the LED-6 is connected to the power source circuit IC101 and, furthermore, an LED-7 and a resistor R101 are serially connected between the output of the power source circuit IC101 and the GND.

Since the serially connected plurality of LEDs (LED-1, LED-2, . . . , LED-6) are reversely biased, a reverse current can be ignored. When a leak current arises in other part than the LED, it is supplied to the comparator 14 via the power source switcher 15 and the leak current is converted to a voltage. The converted voltage is compared with a reference current or a voltage output supplied from the reference power source 13.

When a leak current excepting that in the LED is low in the LED lighting equipment 17 and the voltage converted in the comparator 14 is lower than a comparison value of the reference power source 13, the display device, such as a red LED, of the display unit 12 is driven to be in an off operation state to notify that a red alarm signal is off indicating that a leak current is low.

When the red LED of the display unit 12 is turned on, the state of the switch is held as it is and the power source switcher 15 does not switch to the power source for lighting 11, so that a detection voltage is supplied continuously from the power source for detection 16 as a power source at measurement.

Figure 4:
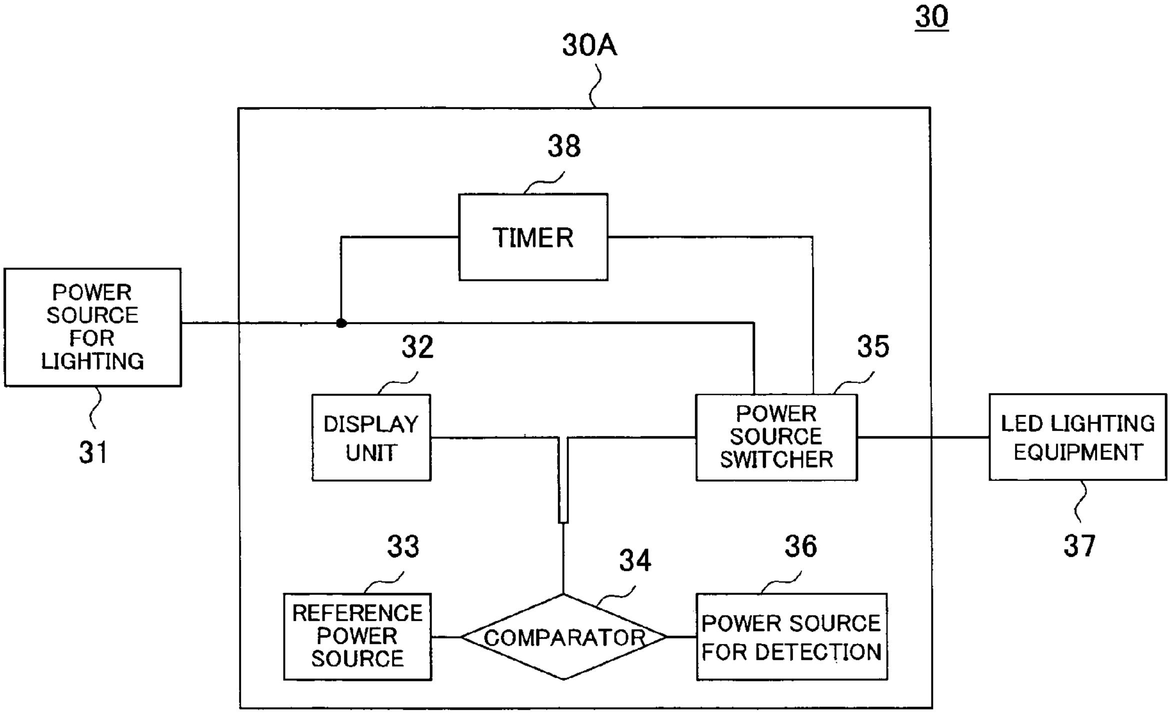
FIG. 4 is a view of a configuration example of an LED lighting leakage detecting device of an automatic change-over type by setting a timer according to an embodiment of the present invention.

Next, an LED lighting leakage detecting device 30 of an automatic switch-over type using a timer as a second embodiment of the present invention will be explained. FIG. 4 shows an overall block diagram of the LED lighting leakage detecting device 30 for measuring a leak current excepting that in the LED by attaining a condition, under which a current flowing to the LED can be ignorable, by supplying a reverse bias to the LED by setting a timer.

The LED lighting leakage detecting device 30 is composed of a power source for lighting 31, a display unit 32, a reference power source 33, a comparator 34, a power source switcher 35, a power source for detection 36, an LED lighting equipment 37 and a timer 38.

The power source for lighting 31 is a DC power source for converting from an AC to a DC and outputting a direct voltage of, for example, DC+24.0V. Other than this, there are a battery drive, etc. and it is not limited to an AC/DC converter.

The display unit 32 uses an LED, etc. and turns it on/off in accordance with a detection result output from the comparator 34. For example, it turns on to light for displaying an alarm when a leak current excepting that in the LED arises and turns off an operation of the LED to turn off the LED display when a leak current does not exist or exists as little as not higher than a reference level.

Also, other than being able to detect a leak current excepting that in the LED instantly by turning on/off the LED, it is possible to display a leak current detection result by using letters, marks and pictures, etc. on the display.

The reference power source 33 is set to be a maximum value of a permitted range of a leak current excepting that in the LED; and when outputting the set current as a comparative current, or when not outputting the comparative current as a current, current-voltage conversion is performed for outputting as a reference voltage. When there are a plurality of LEDs, the set current is reset in accordance with the number of LEDs to be measured.

A reference current value or a reference voltage value output from the reference power source 33 and a current generated due to leak currents flowing in the LED lighting device 37 excepting that in the LED are input to the comparator 34, where the leak currents are converted to a voltage and compared with a detected voltage. The comparison result in the comparator 34 is output to the display unit 32. For example, when the detected voltage is higher than the reference current or reference voltage from the reference power source 33, it is determined that a leak current excepting that in the LED is generated, while when the detection voltage is lower, it is determined that a leak current excepting that in the LED is not generated.

The power source switcher 35 is supplied from the power source for lighting 31 and the power source for detection 36 and configured to automatically switch these power sources in accordance with a control signal from the timer 38. When measuring a leak current, it automatically switches to the power source for detection 36 by the control signal from the timer 38. Voltages supplied to the LED lighting equipment are, for example when there is one LED, a voltage of 0.55V supplied to a power source voltage line, 2.5V supplied to the ground line and a reverse voltage supplied to the LED.

Another voltage supply method is, for example, to switch a power source voltage (+24.0V) to a direct-current voltage of +1.0V and 3.0V, supply the voltage to the power source line of the LED lighting equipment 37, and supply a forward bias to the LED. At this time, the bias is set in a range, by which a current flowing to the LED can be ignored, so that a leak current excepting that in the LED can be measured. When the measurement is completed, it switches to the power source for lighting 31 so as to supply a power source voltage (+24.0V) to the LED lighting equipment 37.

If leakage arises in the LED lighting equipment 37, the power source switcher 35 continues to supply a voltage for detection and measurement.

In the case where a leak current is low in a normal operation, when measurement of a leak current is completed, the switch is turned, so that a direct-current voltage (24.0V) can be supplied from the power source for lighting 31.

The power source for detection 36 generates a direct-current voltage of 0.55V and 2.5V as explained above when the power source is switched by the power source switcher 35 to measure leakage of the LED lighting equipment 37 and when a reverse bias is supplied to the LED.

On the other hand, when supplying a forward voltage to the LED, the power source for detection 36 outputs, for example, a direct-current voltage of +1.0V in the case of a red LED and +3.0V in the case of a blue LED.

After measuring a leak current for a predetermined period, a control signal is supplied from the timer 38 and the power source is automatically switched from the power source for detection 36 to the power source for lighting 31. Then, a power is supplied from the power source for lighting 31 to the LED lighting equipment 37.

As the LED lighting equipment 37, there are, for example, line display devices as shown in FIG. 1A and FIG. 1B and other variety of display devices.

The timer 38 may be configured by a digital circuit or an analog circuit. It starts to operate at a point when mounting the LED lighting leakage detecting device 30 to the LED lighting equipment 37. At the point of starting operation, the power source switcher 35 switches to the power source for detection 36 (or it may be set to use the power source for detection 36 from the beginning) so as to detect a leak current in the LED lighting equipment 37 and a voltage output from the power source for detection 36 is output.

In a basic circuit configuration of the timer 38, in the case of configuring it by an analog circuit, for example, it may be composed of an integral circuit having a time constant or a CR, wherein a control signal is supplied to the power source switcher 35 at a point where an integrated voltage value reaches to half (+12.0V) a power source for lighting to finish the leakage detecting period, then, the power source is switched from the power source for detection 36 to the power source for lighting 31 to return to a normal lighting operation.

Next, an operation of the LED lighting detecting system 30 of an automatic switch-over type using a timer will be explained with reference to FIG. 4. The timer 38 starts to operate at the same time of mounting the LED lighting leakage detecting device to the LED lighting equipment 37. At the point of starting operation, the power source switcher 35 is set to the power source for detection 36 by a control signal output from the timer 38. The power source for detection 36 generates a direct-current voltage for a voltage for detection (+0.55V, +1.0V and +3.0V, etc.) and supplies to the LED lighting equipment 37.

For example, in FIG. 1B, when supplying a reverse bias to the LED of the LED lighting equipment 37, since 6 LEDs are provided, a voltage of +0.55V is supplied to the power source line 101 and +1.0*6V are supplied to the ground line 102, respectively. Between the power source line 101 and the ground line 102, a plurality of LEDs (LED-1, LED-2, . . . , LED-6) are serially connected, an output of the LED-6 is connected to the power source circuit IC101, furthermore, an LED-7 and a resistor R101 are serially connected between an output of the power source circuit 101 and GND.

Since the serially connected plurality of LEDs (LED-1, LED-2, . . . , LED-6) are reversely biased, a voltage supplied to one LED is +1.0V and a current flowing to the LED is 0.001 mA or lower, which can be normally ignored. Accordingly, when a leak current excepting that in the LED arises, it is supplied to the comparator 34 via the power source switcher 35 and the leak current is converted to a voltage. The converted voltage is compared with a reference current or a voltage output supplied to the reference power source 33.

In the case where a leak current is low excepting that in the LED in the LED lighting equipment 37 and a voltage converted in the comparator 34 is lower than the comparative value of the reference power source 33, a display device, such as a red LED, etc. is driven in the display unit 32 and set to be in an off operation state to notify that a red alarm signal is off indicating that a leak current is low.

On the other hand, when a leak current excepting that in the LED is higher than a regulated value in the LED lighting equipment 37, the leak current is supplied to the comparator 34 via the power source switcher 35, the current is converted to a voltage, and when the converted voltage is higher than a comparative value of the reference power source 33, a display device, such as a red LED, etc. is driven in the display unit 32 and set to be in an on operation state to turn on the red alarm signal indicating that a leak current is high.

When the red LED of the display unit 32 is turned on, a set state of the switch is held and the power source switcher 35 does not switch to the power source for lighting 31, so that a detection voltage is supplied from the power source for detection 36 as a power source at measuring. Alternately, the power supplied to the power source line may be cut off.

When a predetermined period as the leakage measuring time of, for example, 1.6 second elapses according to the timer 38, the timer 38 outputs a control signal to the power source switcher 35. Consequently, the switch is automatically turned from the power source for detection 36 to the power source for lighting 31 and a direct-current voltage of +24.0V is supplied to the LED lighting equipment, so that the state returns to the normal lighting operation.

Next, the circuit configuration of an LED lighting leakage detecting device 50 as a third embodiment of the present invention will be explained with reference to FIG. 5.

First, the circuit configuration of the LED lighting leakage detecting device 50 will be explained. The LED lighting leakage detecting device 50 shown in FIG. 5 supplies a power source voltage of, for example, +24.0V to an input terminal "i1" and an input terminal "i2" thereof is grounded (0V).

The input terminal "i1" is connected to one terminal of a resistor R1, the other terminal is connected to one terminal of a capacitor C2 and the other terminal of the capacitor C2 is connected to the ground "i2". A cathode of a diode D1 is connected to the input terminal "i1" and an anode thereof is connected to a common connection point of the resistor R1 and the capacitor C2. The resistor R1 and the capacitor C2 configure an integral circuit and, when a power is supplied between the input terminal (power source terminal) "i1" and the input terminal (ground) "i2", the voltage rises at a predetermined time constant toward the power source voltage.

One terminal of a resistor R2 is connected to the input terminal "i1", the other terminal is connected to one terminal of the resistor R3, and the other terminal of the resistor R3 is connected to the ground "i2". The common connection point of the resistor R1 and the capacitor C2 is connected to an inverted input terminal of an operation amplifier IC1 and a common connection point of the resistors R2 and R3 is connected to a non-inverted input terminal thereof.

One terminal of a resistor R10 is connected to the input terminal "i1", the other terminal is connected to a cathode of a zener diode U1, and an anode of the zener diode U1 is connected to the ground "i2".

A common connection point of the resistor R10 and the zener diode U1 is connected to a non-inverted input terminal of an operational amplifier IC3, an output terminal of the operational amplifier IC3 is connected to an inverted input terminal and configures a feedback circuit, which is a voltage follower circuit and an equivalent voltage to a reference voltage supplied to the non-inverted input terminal is output as a reference voltage from the output terminal.

The input terminal "i1" is connected to one terminal of a relay RLY1, and the other terminal is connected to a collector of an NPN transistor Q1. An emitter of the NPN transistor Q1 is connected to the ground "i2", and a based is connected to the ground "i2" via a resistor R9 and to one terminal of a resistor R8. Furthermore, the other terminal of the resistor R8 is connected to a cathode of a diode D2 and an anode thereof is connected to an output of an operational amplifier.

A contact point "a" of the relay RLY1 is connected to the input terminal "i1", a first common connection point "b" is connected to an output terminal "o1", and a contact point "c" is connected to one terminal of a resistor R7 and to a non-inverted input terminal of an operational amplifier IC2, respectively. The other terminal of the resistor R7 is connected to the ground "i2".

Also, a contact point "d" of the relay RLY1 is connected to the ground "i2", a second common connection point "e" is connected to an output terminal "o2", and a contact point "f" is connected to an output terminal of an operational amplifier IC3.

A common connection point of the resistor R10 and the zener diode U1 is connected to one terminal of a resistor R5, and the other terminal is connected to one terminal of a resistor R6 and to a non-inverted input terminal of the operational amplifier IC2. The other terminal of the resistor R6 is connected to the ground "i2". A common connection point of the contact point "c" of the relay RLY1 and the resistor R7 is connected to a non-inverted input terminal of the operational amplifier IC2, and an output terminal of the operational amplifier IC2 is connected to one terminal of a resistor R4 and to an anode of a diode D3, respectively. The other terminal of the resistor R4 is connected to an anode of the LED1 and a cathode of the LED1 is connected to the ground "i2".

A cathode of the diode D3 is connected to a cathode of the diode D2 and one terminal of the resistor R8.

Next, a circuit operation of the LED lighting leakage detecting device 50 will be explained with reference to FIG. 5 and FIG. 6.

Figures 6A, 6B, 6C, 6D:
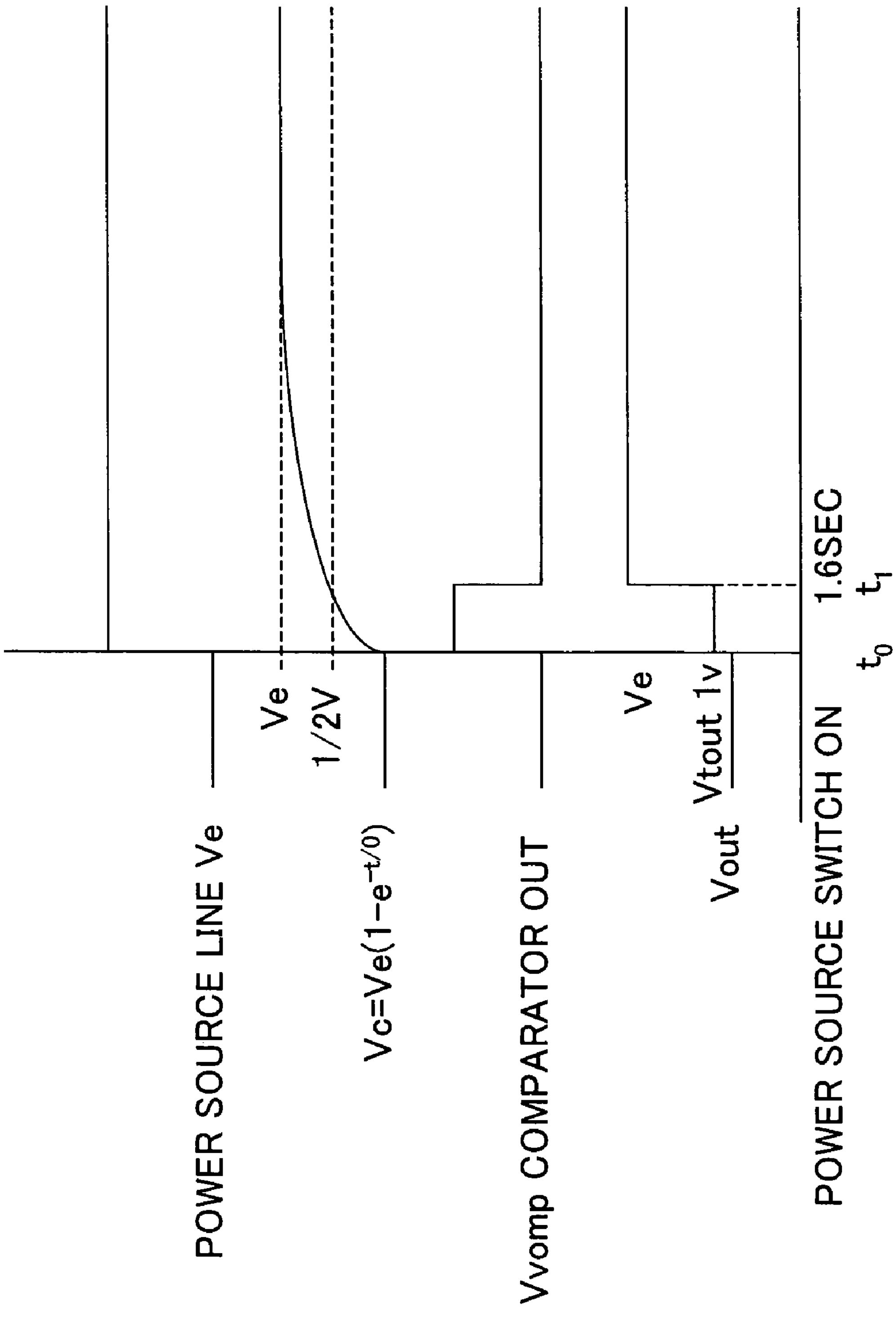
FIG. 6A to FIG. 6D are timing charts for explaining a circuit operation of the LED lighting leakage detecting device shown in FIG. 5.

In timing charts in FIG. 6A to FIG. 6D, when a power source voltage of, for example, +24.0V is supplied to the input terminal "i1" at time "to", a voltage of the input terminal "i2" rises discretely as shown in FIG. 6A. Consequently, because the resistor R1 and the capacitor C2 compose an integral circuit, the common connection point of the resistor R1 and the capacitor C2 rises at a predetermined time constant ($\tau$=C2*R1) and increases toward the power source voltage Vc (+24.0V).

On the other hand, a reference voltage supplied to the non-inverted input terminal of the operational amplifier IC1 is determined to resistor values of the resistors R2 and R3 and, since the resistors R2 and R3 have the same value, it becomes +12.0V when the power source voltage is +24.0V.

During a period that the common connection point of the resistor R1 and the capacitor C2 rises to reach to a reference voltage of +12.0V supplied to the non-inverted input terminal of the operational amplifier IC1, the operational amplifier IC1 outputs an output voltage of an "H" level and supplies the same to the diode D2 (refer to FIG. 6C).

The "H" level output voltage supplied to the cathode of the diode D2 is divided by the resistor RB and the resistor R9, and the divided voltage is supplied to a base of an NPN transistor Q1. As a result, the NPN transistor Q1 turns on, a current flows to the collector, a switch of the relay RLY1 is automatically switched, the first common connection point "b" is connected to the contact point "C", and the second common connection point "e" is connected to the contact point "f".

In this state, an output voltage of the operational amplifier IC3 is 2.5V, so that when there is one LED in the LED lighting equipment, the voltage of 2.5V is output to the output terminal "o2" via the second contact point "e". When 6 LEDs are connected in series, the voltage output from the contact point "e" has to be 2.5*6V. In that case, it is sufficient to set a voltage to be obtained from the zener diode U1 to 2.5*6V, which can be attained by using a zener diode with a standard output voltage of 2.5*6V, serially connecting 6 zener diodes with a standard output voltage of 2.5V, or configuring a constant voltage (generating) circuit with an output of 15.0V by using a band-cap reference circuit, etc. Since the voltage of 2.5*6V output from the output terminal "o2" is supplied to the ground line 102 and the power source line 101 is connected to the output terminal "o2", it is connected to the ground "i2" via the resistor R7, consequently, the LEDs (LED-1, LED-2, . . . , LED-6) are reversely biased to set a current flowing to the LEDs in an ignorable range, so that a leak current in the LED lighting equipment 17 excepting that in the LEDs is measured.

When a leak current excepting that of the LEDs is low and a voltage generated in the resistor R7 is lower than a reference voltage of a non-inverted input terminal of the operational amplifier IC2, a voltage of an "L" level of, for example, 0V is output from the output terminal of the operational amplifier IC2 and the diode D3 turns off, furthermore, the LED1 (D5) also turns off and does not emit light. Namely, when a leak current excepting that in the LEDs is small, the LED1 as an alarm light turns off indicating that it is non-defective.

On the other hand, when a leak current higher than a reference value flows to those excepting the LEDs (LED-1, LED-2, . . . , LED-6), a voltage generated in the resistor R7 becomes higher than the reference voltage supplied to the non-inverted input terminal of the operational amplifier IC2 and a voltage at an "H" level is output from the output terminal. As a result, a current flows to the LED1 and the LED1 emits light to alarm indicating that the leak current is higher than the regulated value.

Also, the "H" level voltage output from the output of the operational amplifier IC2 is supplied to the resistor R8 via the diode D3, divided by the resistors R8 and R9 and supplied to the base of the NPN transistor Q1. As a result, when an "L" level output voltage is supplied from the operational amplifier IC1, that is, even when a measurement period has passed, the NPN transistor Q1 keeps the on operation state.

Next, as shown in the timing charts in FIG. 6A to FIG. 6D, when the measuring time elapses to reach to the time "t1" (for example, 1.6 second), as shown in FIG. 6B, FIG. 6C and FIG. 6D, a voltage at the common connection point of the resistor R1 and the capacitor C2 rises, and when the voltage reaches ½*Vc (=+12.0V) and beyond, the output of the operational amplifier IC1 changes from the "H" level to the "L" level, and the "L" level voltage of, for example, 0V is supplied to the diode D2. As a result, the base of the NPN transistor is supplied with a voltage of 0V and becomes in an off operation state. In accordance therewith, the first common contact point "b" of the relay is connected to the contact point "a", and the second common contact point "e" is connected to the contact point "d". Accordingly, the output terminal "o1" is connected to the input terminal "i1" and outputs a voltage of +24.0V, and the output terminal "o2" becomes a ground level as a result that the contact point "e" is connected to the ground "i2" via the contact point "d". Therefore, voltages for the normal operation are supplied from the output terminals "o1" and "o2" to the LED lighting equipment.

Since the contact point "c" of the relay RLY1 is at a floating level, the non-inverted input terminal of the operational amplifier IC2 is connected to the ground via the resistor R6 and a voltage supplied to the non-inverted input terminal is high, an "L" level voltage is output from the output terminal, the diode D3 turns off, and the LED1 also turns off and does not emit light.

As explained above, by attaining a condition, under which a current flowing to the LEDs can be ignored more comparing with a leak current flowing to the LED lighting equipment, by supplying a reverse voltage (reverse bias) to the LEDs, that is, by utilizing the characteristic that a current does not flow in the reverse direction in an LED, an existence of a factor of a current flowing other than the LEDs can be detected by supplying a reverse voltage to the LEDs only during the detecting time and detecting a current flowing in the LED lighting equipment.

Figure 7:
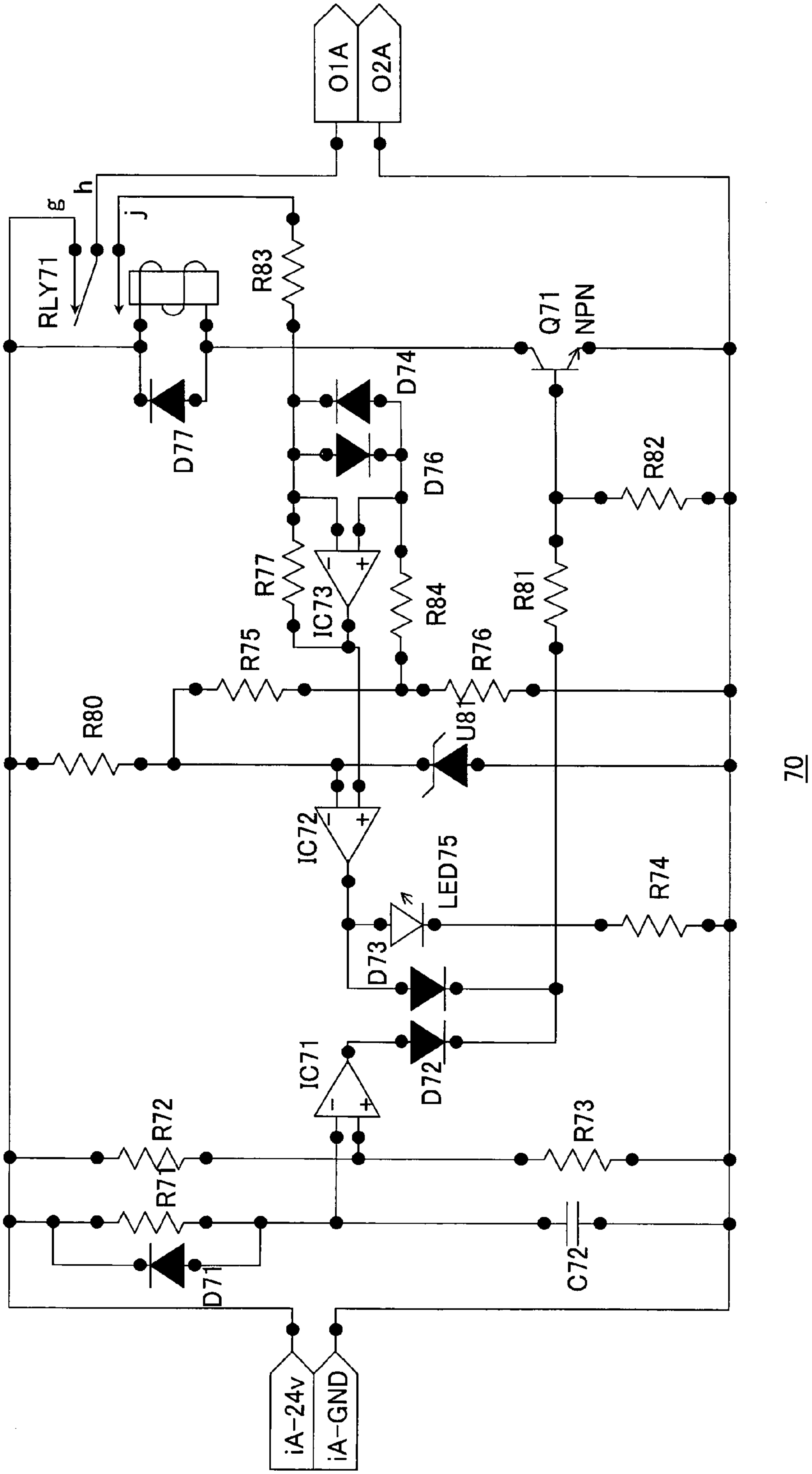
FIG. 7 is a view of an example of a circuit configuration of an LED lighting leakage detecting device according to an embodiment of the present invention.

Next, an LED lighting leakage detecting device 70 for measuring a leak current by supplying a forward bias to LEDs by setting a timer as a fourth embodiment of the present invention will be explained by using FIG. 7.

First, the circuit configuration of the LED lighting leakage detecting device 70 will be explained. The LED lighting leakage detecting device 70 shown in FIG. 7 is supplied with a power source voltage of, for example, 24.0V at an input terminal "i1A" and an input terminal "i2A" is at a ground level (0V).

The input terminal "i1A" is connected to one terminal of a resistor R71, the other terminal is connected to one terminal of the capacitor C72, and the other terminal of the capacitor C72 is connected to the ground "i2A". Also, a cathode of a diode D71 is connected to the input terminal "i1A", and an anode is connected to a common connection point of the resistor R71 and the capacitor C72. The resistor R71 and the capacitor C72 compose an integration circuit and, when a power is supplied between the input terminal "i1A" and the ground "i2A", the voltage rises at a predetermined time constant toward the power source voltage.

One terminal of the resistor R72 is connected to the input terminal "i1A", the other terminal is connected to one terminal of a resistor R73, and the other terminal of the resistor R73 is connected to the ground "i2A". A common connection point of the resistor R71 and the capacitor C72 is connected to a inverted input terminal of an operational amplifier IC71, and a common connection point of the resistors R72 and the R73 is connected to a non-inverted input terminal.

One terminal of a resistor R80A is connected to the input terminal "i1A", the other terminal is connected to a cathode of a zener diode U81, and an anode of the zener diode U81 is connected to the ground "i2A".

The zener diode U81 is used for generating a reference voltage, but instead of this, a diode and a transistor, etc. may be used for configuring a constant voltage (generating) circuit for generating any output voltage.

A common connection point of the resistor R80 and the zener diode U81 is connected to one terminal of a resistor 75, the other terminal is connected to one terminal of a resistor R76, and the other terminal of the resistor R76 is connected to the ground "i2A".

A common connection point of the resistors R75 and R76 is connected to a non-inverted input terminal of an operational amplifier IC73 via a resistor R84, an inverted input terminal of the operational amplifier IC73 is connected to an output terminal via a resistor R77 and configures a feedback circuit. Furthermore, between the non-inverted input terminal and inverted input terminal of the operational amplifier IC73, diodes D76 and D77 are reversely connected to each other to protect the input terminals.

The common connection point of the resistor R80 and the zener diode U81 is connected to an inverted input terminal of the operational amplifier IC72, and a non-inverted input terminal thereof is connected to an output to the operational amplifier IC73.

An output of the operational amplifier IC72 is connected to an anode of the LED75 and to an anode of the diode D73. The other terminal of the LED75 is connected to one terminal of a resistor 74, and the other terminal of the resistor R74 is connected to the ground "i2A".

An output of the operational amplifier IC71 is connected to an anode of the diode D72, and a cathode thereof is commonly connected to a cathode of the diode D73 and to one terminal of the resistor R81. The other terminal of the resistor R81 is connected to one terminal of a resistor R82 and to a base of a NPN transistor Q71. The other terminal of the resistor R82 is connected to the ground "i2A".

An emitter of the NPN transistor Q71 is connected to the ground "i2A", and a collector is connected to the input terminal "i1A" via the relay RLY71. Also, a diode D77 is connected in parallel with the relay RLY71, a cathode thereof is connected to the input terminal "i1A", and an anode is connected to a collector of the NPN transistor Q71.

A contact point "g" of the relay RLY71 is connected to the ground "i2A", a common contact point "h" is connected to the output terminal "o1A" and a contact point "j" is connected to one terminal of the resistor R83, respectively. Furthermore, the other terminal of the resistor R83 is connected to an inverted input terminal of the operational amplifier IC73.

Next, a circuit operation of the LED lighting leakage detecting device 70 will be explained by using FIG. 6A to FIG. 6D and FIG. 7.

As shown in FIG. 6A to FIG. 6D, when a power source voltage of, for example +24.0V is supplied to the input terminal "i1A" at a time "t0", the voltage rises discretely as shown in FIG. 6A. As a result, since the resistor R71 and the capacitor C72 composes an integral circuit, a common connection point of the resistor R71 and the capacitor C72 rises at a predetermined time constant (τ=C72*R71) and increases toward the power source voltage Vc (+24.0V).

On the other hand, a reference voltage to be supplied to the non-inverted input terminal of the operational amplifier IC71 is determined by the resistance values of the resistors R72 and R73 and, since the R72 and R73 have the same value, it becomes +12.0V when the power source voltage is +24.0V.

As the time elapses from turning on the power source, the common connection point of the resistor R71 and the capacitor C72 rises. Until it reaches to the reference voltage of +12.0V supplied to the non-inverted input terminal of the operational amplifier IC71, the operational amplifier IC71 outputs an "H" level output voltage to the diode D72 (FIG. 6C).

The "H" level output voltage supplied to the cathode of the diode D72 is divided by the resistor R81 and the resistor R82, and the divided voltage is supplied to the base of the NPN transistor Q71. As a result, the NPN transistor Q71 turns on, a current flows to the collector, a switch of the relay RLY71 is automatically switched, and the common contact point "h" is connected to the contact point "j".

The common connection point of the resistor 80 and the zener diode U81 is determined by a regulated voltage of the zener diode. When assuming that 6 zener diodes of 2.5V connected in series are the U81, the value becomes 2.5*6V. since a serial resistors R75 and R76 are connected between the cathode of the zener diode U81 and the ground. "i2A", a voltage is divided at the common connection point of the resistors. R75 and R76 and a voltage of, for example, 1.0*6V is obtained. The divided voltage is supplied to the non-inverted input terminal of the operational amplifier IC73 via the resistor 84.

The reference voltage can be set freely by selecting a zener diode U81 and by using other voltage generating circuit as explained above.

Figure 2A:
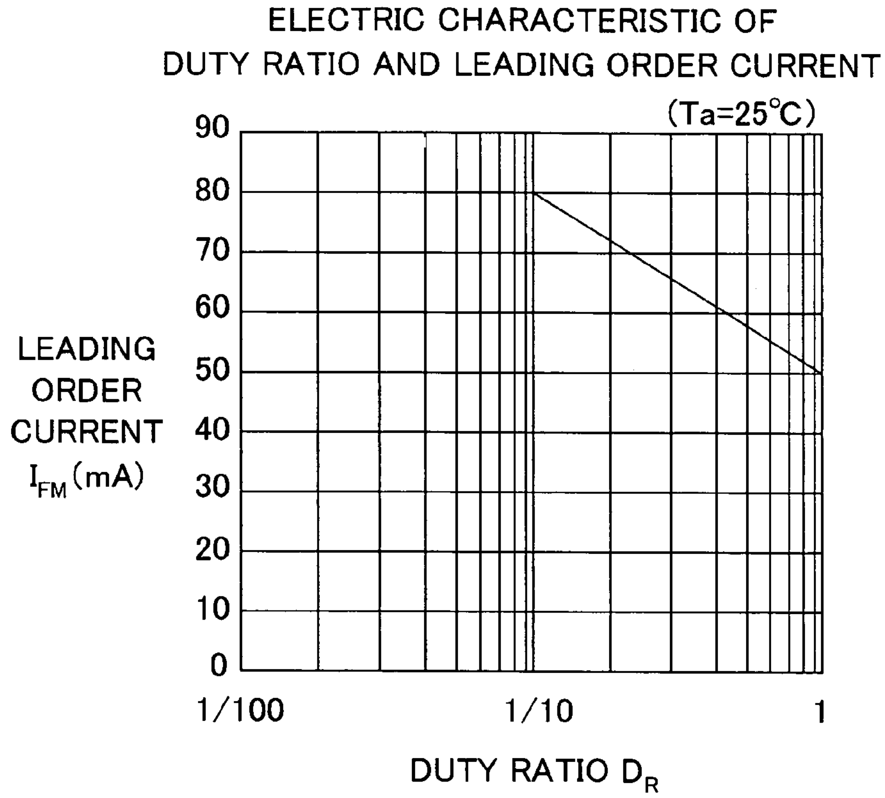
FIG. 2A and FIG. 2B are graphs showing electric characteristics of LEDs.
Figure 2B:
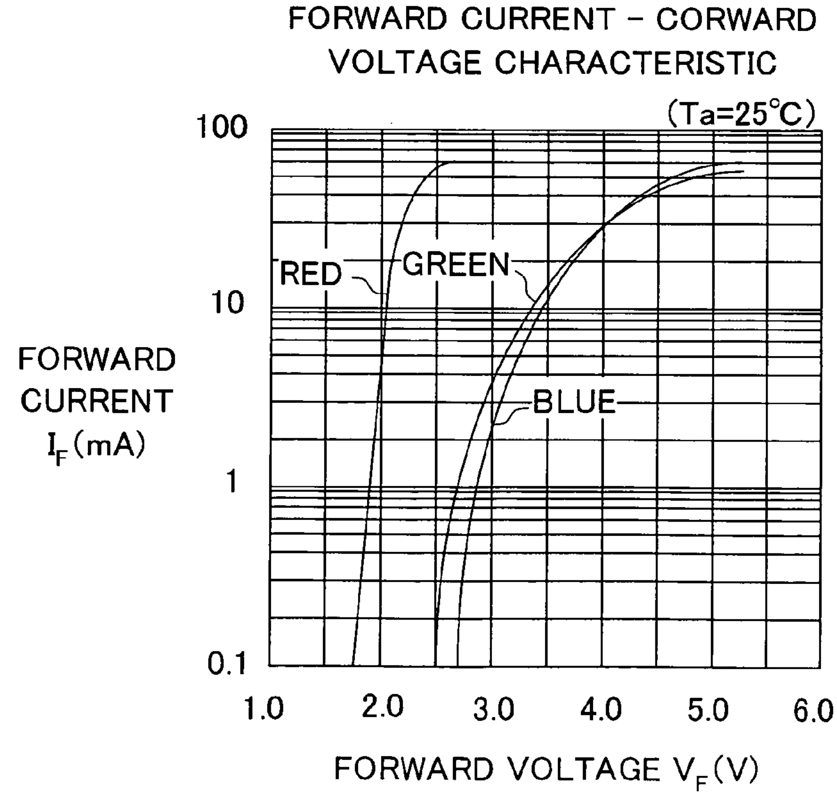

The output terminal "o1A" is connected to the power source line 101 (refer to FIG. 1A and FIG. 1B) of the LED lighting equipment 37, and the output terminal "o2A" is connected to the ground line 102. Now, it is assumed that an inverted input terminal of the operational amplifier. IC73 is supplied with a voltage of 1.0*6V and a forward voltage of 1.0V is supplied to each of the LEDs (LED-1, LED-2, . . . , LED-6). When assuming that the forward voltage of 1.0V is applied to an LED, a forward current becomes 0.001 mA as shown in FIG. 2B. Namely, the forward current flowing to the LED under this condition is very low and ignorable comparing with a leak current flowing in the LED lighting equipment 37. Accordingly, it is possible to measure a leak current excepting that in the LEDs.

When the leak current in the LED lighting equipment excepting that in the LEDs (LED-1, LED-2, . . . , LED-6) is not higher than a regulated value, that is, when a voltage generated by the leak current in the LED lighting equipment 37 flowing via the LEDs is low or an equivalent resistance by the leak current is high, and a voltage generated at an output of the operational amplifier IC73 is not higher than that in the zener diode U81 (2.5*6V), a voltage of a non-inverted input terminal of the operational amplifier IC72 is lower than the reference voltage of the inverted input terminal, so that an "L" level voltage of, for example, 0V is output. As a result, the diode D73 turns off and the LED75 also turns off, so that the LED75 does not light up. This indicates that an alarm signal of the LED75 is off. Namely, when a leak current in LEDs is low, the LED1 as an alarm light is turned off to indicate it is non-defective.

When a leak current in the LED lighting equipment flowing via the LEDs (LED-1, LED-2, . . . , LED-6) is higher than a regulated value, that is, when a voltage generated by the leak current flowing via the LEDs is high, in other words, an equivalent resistance of the LEDs becomes low due to the leak current and a voltage generated at the output of the operational amplifier IC73 is not lower than that of the zener diode U81 (2.5*6V), a voltage at the non-inverted input terminal of the operational amplifier IC72 is higher than the reference voltage of the inverted input terminal, an "H" level voltage is output. As a result, the diode D73 turns on and the LED75 also turns on, so that the LED75 lights up to alarm that a leak current arises.

Also, since the output of the operational amplifier IC72 outputs an "H" level voltage, a voltage is supplied to the resistors R81 and R82 via the diode D73. The base of the NPN transistor Q71 is supplied with a voltage divided by the resistors R81 and R82, an on operation state is maintained, and the common contact point "h" of the relay RLY71 is connected to the contact point "j".

Next, when the measuring time elapses after the power is on and reaches the time "t1", as shown in the FIG. 6B to FIG. 6D, a voltage at the common connection point of the resistor R1 and the capacitor C2 rises, and when the voltage reaches ½*Vc (+12.0V) and beyond, the output of the operational amplifier IC71 changes from the "H" level to the "L" level, and the "L" level voltage of, for example, 0V is supplied to the resistor R81. since the common connection point of the resistors R81 and R82 is at 0V, the base voltage of the NPN transistor Q1 becomes 0V to be in an off operation state. In accordance therewith, the common contact point "h" of the relay RLY71 is connected to the contact point "g". Accordingly, the output terminal "o1A" is connected to the input terminal. "i1A" and outputs a voltage of +24.0V, and the output terminal "o2A" is connected to the ground "i2A" and becomes a ground level. Therefore, voltages for the normal operation are supplied from the output terminals "o1A" and "o2A" to the LED lighting equipment.

Since the contact point "j" of the relay RLY71 is at a floating level, equivalent resistance between the non-inverted input terminal of the operational amplifier IC73 and the ground "i2A" becomes infinite, so that a voltage of 1.0*6V is output from the output terminal. However, since the non-inverted input terminal of the operational amplifier IC72 is supplied with a voltage of 2.5*6V as explained above, so that an "L" level voltage is output. As a result, the diode D73 turns off, and the LED75 also turns off.

Since a voltage supplied to the input terminal is high, an "L" level voltage is output from the output terminal, so that the diode D73 turns off and the LED75 also turns off and does not emit light.

An automatic switch-over type LED lighting equipment was explained above, but a leak current can be also detected by a manual switch-over type LED lighting leakage detecting device.

Figure 5:
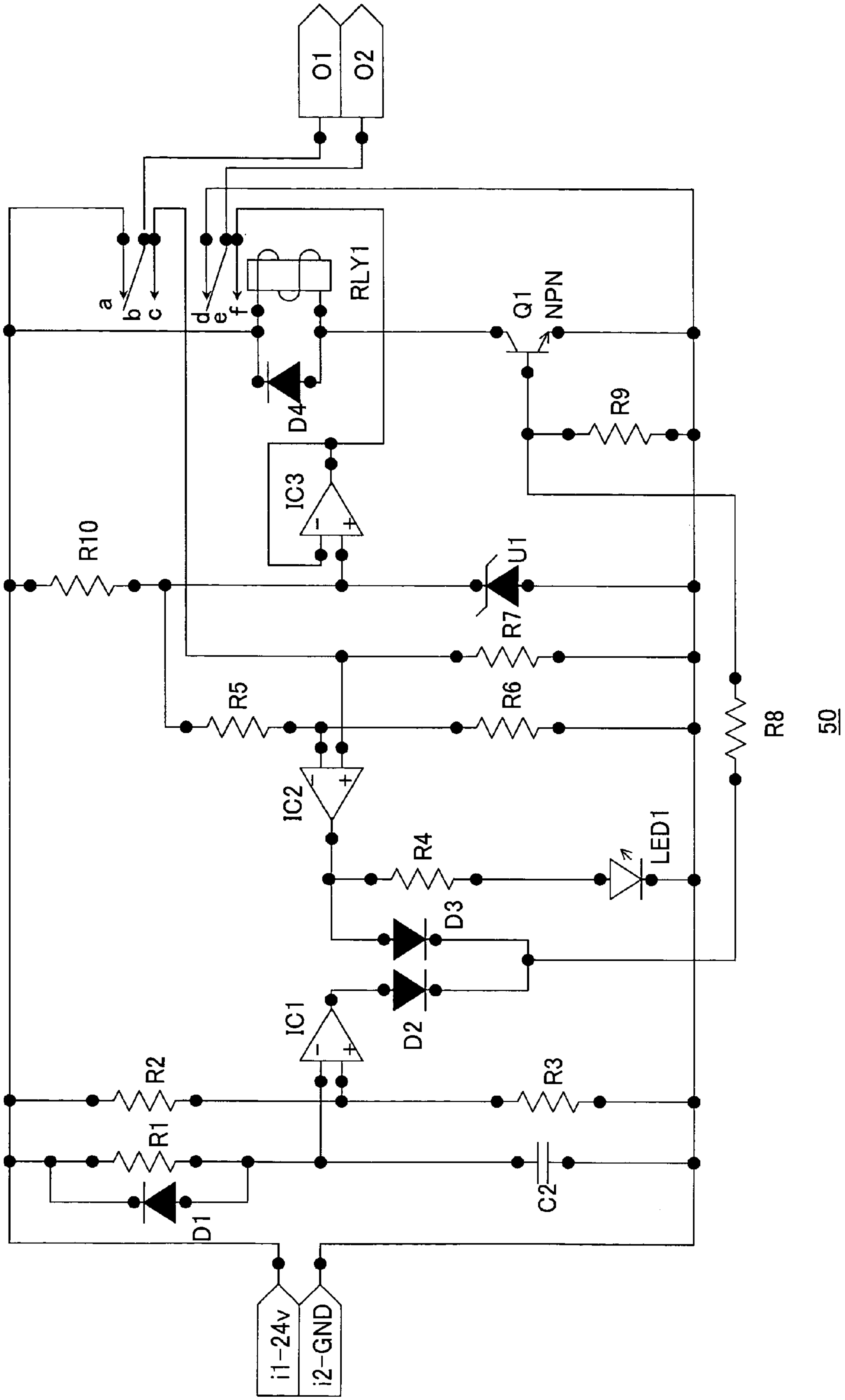
FIG. 5 is a view of an example of a circuit configuration of an LED lighting leakage detecting device according to an embodiment of the present invention.

For example, in the circuit configuration of the LED lighting leakage detecting device shown in FIG. 5, a switch provided with a protective resistance is connected between a collector and emitter of the NPN transistor Q71 or ground. By turning on the switch to flow a current to the relay at leak current measurement, connecting the common contact point "h" to the contact point "j", outputting to the output terminal "o1A" a detection voltage from the detection power source, supplying the same to the LED lighting equipment 37 and performing the same operation as that explained above, a leak current excepting that in the LEDs can be detected.

As explained above, by utilizing the characteristics that a current to make LEDs emit light is in one direction and the forward current becomes virtually ignorable when it is not higher than the forward voltage Vf of the diodes, it is possible to detect an existence of a factor of flowing a current other than the LEDs by supplying a forward voltage to the LED only during the detecting time and detecting a current flowing to the LED lighting equipment.

It should be understood by those skilled in the art that various modifications, combinations, sub-combinations and alternations may occur depending on design requirements and other factors insofar as they are within the scope of the appended claims or the equivalents thereof.

What is claimed is:

1. A leakage detecting device using a light emitting diode, comprising:

a first power source for supplying power when said light emitting diode illuminates;

a second power source for supplying a predetermined bias to said light emitting diode;

a switching circuit for switching said first power source and said second power source;

a reference power source for supplying a reference signal for comparing a leak current of a lighting device using said light emitting diode; and a comparator for comparing said reference signal output from said reference power source with the leak current of the lighting device using said light emitting diode and outputting a control signal based on the comparison result by switching to said second power source by said switching circuit.

2. A leakage detecting device as set forth in claim 1, wherein a predetermined bias to be supplied to said light emitting diode is set to be not higher than a threshold voltage of a reverse voltage or a forward bias of said light emitting diode by supplying power from said second power source by switching from said first power source for lighting the lighting.

3. A leakage detecting device as set forth in claim 1, wherein said switching circuit switches to said second power source for a predetermined period when lighting said lighting device.

4. A leakage detecting device as set forth in claim 2, wherein said switching circuit switches to said second power source for a predetermined period when lighting said lighting device.

5. A leakage detecting device as set forth in claim 1, wherein said leakage detecting device comprises a control circuit for stopping supplying said first power to said lighting device when displaying said leakage sign.

6. A leakage detecting device as set forth in claim 2, wherein said leakage detecting device comprises a control circuit for stopping supplying said first power to said lighting device when displaying said leakage sign.

7. A leakage detecting device as set forth in claim 3, wherein said leakage detecting device comprises a control circuit for stopping supplying said first power to said lighting device when displaying said leakage sign.

8. A leakage detecting device as set forth in claim 1, wherein said leakage detection device further comprises a display means for displaying a leakage signal when a leak current in the lighting device using said light emitting diode is higher than a reference signal output from said reference power source based on a control signal output from said comparator.

9. A leakage detecting device as set forth in claim 2, wherein said leakage detection device further comprises a display means for displaying a leakage signal when a leak current in the lighting device using said light emitting diode is higher than a reference signal output from said reference power source based on a control signal output from said comparator.

10. A leakage detecting device as set forth in claim 3, wherein said leakage detection device further comprises a display means for displaying a leakage signal when a leak current in the lighting device using said light emitting diode is higher than a reference signal output from said reference power source based on a control signal output from said comparator.

11. A leakage detecting device as set forth in claim 4, wherein said leakage detection device further comprises a display means for displaying a leakage signal when a leak current in the lighting device using said light emitting diode is higher than a reference signal output from said reference power source based on a control signal output from said comparator.

12. A leakage detecting device as set forth in claim 5, wherein said leakage detection device further comprises a display means for displaying a leakage signal when a leak current in the lighting device using said light emitting diode is higher than a reference signal output from said reference power source based on a control signal output from said comparator.

13. A leakage detecting device as set forth in claim 6, wherein said leakage detection device further comprises a display means for displaying a leakage signal when a leak current in the lighting device using said light emitting diode is higher than a reference signal output from said reference power source based on a control signal output from said comparator.

14. A leakage detecting device as set forth in claim 7, wherein said leakage detection device further comprises a display means for displaying a leakage signal when a leak current in the lighting device using said light emitting diode is higher than a reference signal output from said reference power source based on a control signal output from said comparator.

* * * * *

UNITED STATES PATENT AND TRADEMARK OFFICE

CERTIFICATE OF CORRECTION

PATENT NO. : 7,375,936 B2
APPLICATION NO. : 11/241838
DATED : May 20, 2008
INVENTOR(S) : Masazumi Morishita It is certified that error appears in the above-identified patent and that said Letters Patent is hereby corrected as shown below:

On the title page Item (73) Assignee should read: Sugatsune Kogyo Co., Ltd., Tokyo (JP)

Signed and Sealed this

Twelfth Day of August, 2008

JON W. DUDAS
*Director of the United States Patent and Trademark Office*